(12) United States Patent
Boeldt et al.

(10) Patent No.: US 10,177,932 B2
(45) Date of Patent: Jan. 8, 2019

(54) METHOD FOR CONNECTING A DOMESTIC APPLIANCE TO A WIRELESS HOME NETWORK, COMPUTER PROGRAM PRODUCT, PORTABLE COMMUNICATIONS TERMINAL AND DOMESTIC APPLIANCE

(71) Applicant: BSH HAUSGERAETE GMBH, Munich (DE)

(72) Inventors: Frank Boeldt, Brieselang (DE); Susett Starke, Berlin (DE)

(73) Assignee: BSH Hausgeraete GmbH, Munich (DE)

(*) Notice: Subject to any disclaimer, the term of this patent is extended or adjusted under 35 U.S.C. 154(b) by 67 days.

(21) Appl. No.: 15/023,730

(22) PCT Filed: Sep. 4, 2014

(86) PCT No.: PCT/EP2014/068778
§ 371 (c)(1),
(2) Date: Mar. 22, 2016

(87) PCT Pub. No.: WO2015/039874
PCT Pub. Date: Mar. 26, 2015

(65) Prior Publication Data
US 2016/0234035 A1    Aug. 11, 2016

(30) Foreign Application Priority Data
Sep. 23, 2013   (DE) .................. 10 2013 219 054

(51) Int. Cl.
| H04W 76/02 | (2009.01) |
| H04L 12/28 | (2006.01) |
| H04W 4/80 | (2018.01) |
| H04W 12/04 | (2009.01) |

(Continued)

(52) U.S. Cl.
CPC ........ *H04L 12/2809* (2013.01); *H04L 12/282* (2013.01); *H04L 12/2821* (2013.01);
(Continued)

(58) Field of Classification Search
CPC .............. H04L 12/282; H04L 12/2821; H04L 12/2803; H04L 12/2807; H04L 12/2809;
(Continued)

(56) References Cited

U.S. PATENT DOCUMENTS

| 8,885,802 | B2 | 11/2014 | Stepanian |
| 2006/0251256 | A1* | 11/2006 | Asokan ................. H04L 63/065 380/270 |

(Continued)

FOREIGN PATENT DOCUMENTS

| WO | 2012094520 A2 | 7/2012 |
| WO | 2013015656 A2 | 1/2013 |

*Primary Examiner* — Andrew W Chriss
*Assistant Examiner* — Lalita W Pace
(74) *Attorney, Agent, or Firm* — Laurence A. Greenberg; Werner H. Stemer; Ralph E. Locher

(57) ABSTRACT

A method connects a domestic appliance to a wireless home network. The method includes receiving access data for the home network by a portable communications terminal, setting up a wireless communication link between the domestic appliance and the portable communications terminal according to a predetermined close-range communications standard, which communication link is separate from the home network, and transmitting control commands from the portable communications terminal to the domestic appliance via the communication link. The control commands control the domestic appliance to connect to the wireless home network using the access data.

8 Claims, 1 Drawing Sheet

(51) Int. Cl.
*H04W 12/08* (2009.01)
*A47L 15/00* (2006.01)
*H04L 29/06* (2006.01)
*H04W 84/12* (2009.01)

(52) U.S. Cl.
CPC ............. *H04W 4/80* (2018.02); *H04W 12/04* (2013.01); *H04W 12/08* (2013.01); *A47L 15/0063* (2013.01); *H04L 12/2803* (2013.01); *H04L 63/0853* (2013.01); *H04L 63/18* (2013.01); *H04L 2012/285* (2013.01); *H04L 2012/2841* (2013.01); *H04W 84/12* (2013.01)

(58) Field of Classification Search
CPC ............... H04L 12/2856; H04L 12/281; H04L 12/2812; H04L 12/2814; H04L 12/2816; H04L 2012/285; H04W 4/008; H04W 12/04; H04W 12/06; H04W 12/08; H04W 76/02; H04W 40/246; H04W 60/00; H04W 88/04; H04W 76/00; G06F 13/36; G06F 13/38; G06F 13/4068; G06F 13/385; G06F 13/40; G06F 13/4004; G06F 13/4063; G06F 13/4072; G06F 2213/00; G06F 2213/0002

USPC ........................................................ 709/227
See application file for complete search history.

(56) References Cited

U.S. PATENT DOCUMENTS

| | | |
|---|---|---|
| 2007/0255945 A1 | 11/2007 | Abujbara et al. |
| 2008/0137553 A1* | 6/2008 | Hsu ........................ H04W 12/06 370/254 |
| 2008/0222711 A1 | 9/2008 | Michaelis |
| 2011/0206054 A1* | 8/2011 | Pajjuri .................... H04W 36/14 370/401 |
| 2012/0108230 A1* | 5/2012 | Stepanian ................ G06F 21/10 455/422.1 |
| 2013/0173811 A1* | 7/2013 | Ha ......................... H04W 76/02 709/227 |
| 2014/0031991 A1* | 1/2014 | Bergman ................ G05D 23/19 700/276 |
| 2014/0156081 A1 | 6/2014 | Ha |
| 2014/0250183 A1* | 9/2014 | Unagami ............. H04M 3/5166 709/204 |
| 2016/0242025 A1* | 8/2016 | Aliyar .................... H04W 12/04 |

\* cited by examiner

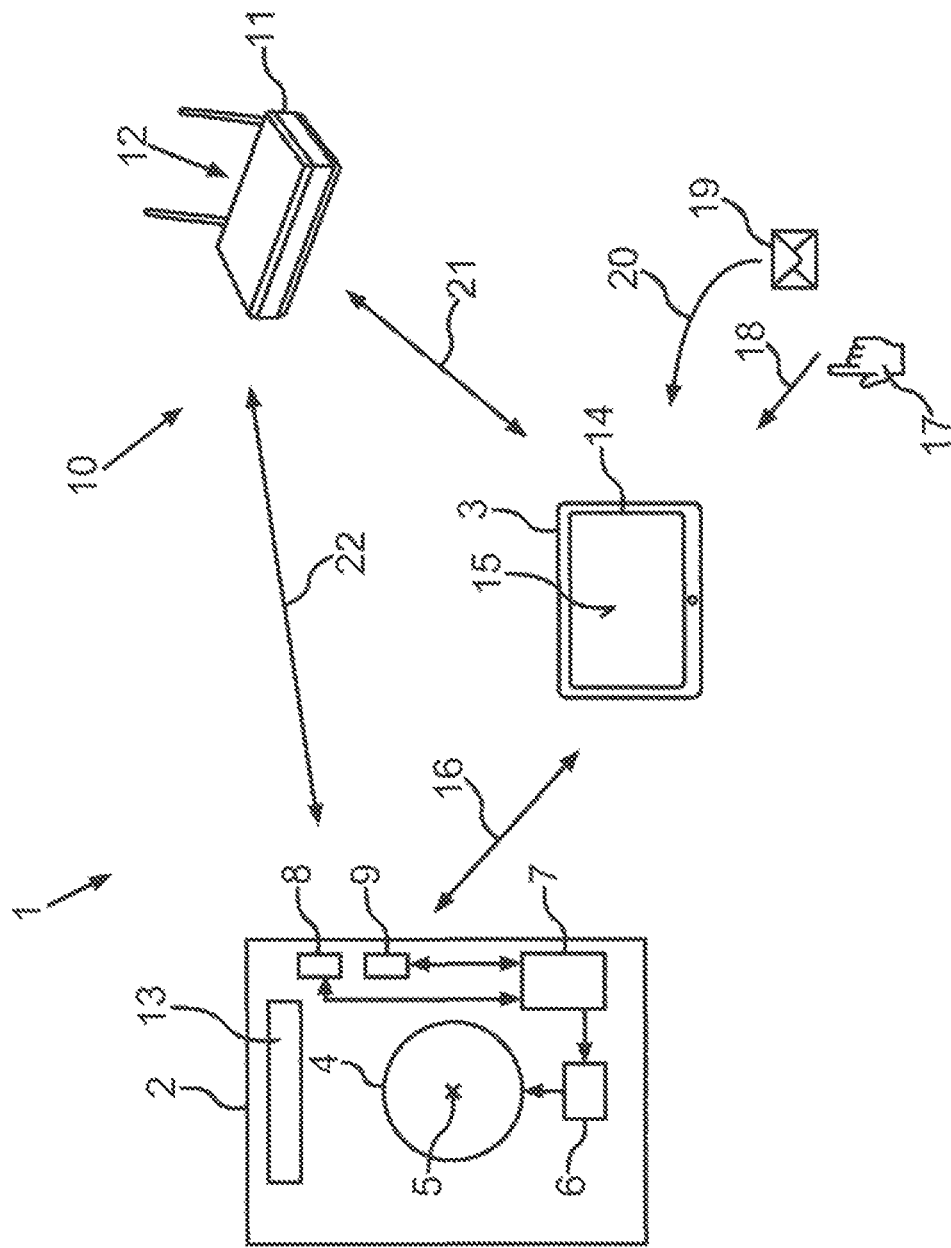

METHOD FOR CONNECTING A DOMESTIC APPLIANCE TO A WIRELESS HOME NETWORK, COMPUTER PROGRAM PRODUCT, PORTABLE COMMUNICATIONS TERMINAL AND DOMESTIC APPLIANCE

BACKGROUND OF THE INVENTION

Field of the Invention

The invention relates to a method for connecting or for registering a domestic appliance to a wireless home network, especially to a WLAN network. The invention also relates to a computer program product, to a portable communications terminal for carrying out such a method and to a domestic appliance.

Connecting a domestic appliance to a wireless local network, especially to a WLAN network, for communication purposes, is already the prior art. Via such a network the domestic appliance can communicate for example with other devices that are likewise connected to the network. On the other hand communication between the domestic appliance and an Internet server is also possible, which can be undertaken via an access point or via a WLAN router respectively. Within the framework of this communication for example there can be transfer from the domestic appliance to the Internet server of status data, which can then be transferred by the Internet server to an Internet-enabled communications terminal. For example the user of the domestic appliance can access the status data that is stored on the Internet server with his smartphone. The status data can for example involve information relating to an operating process of the domestic appliance, such as especially the remaining time needed to complete the operating process, or information about the operating process—for example a washing cycle—already having been completed. Within the framework of this communication, operation of the domestic appliance using the portable communications terminal—for example said smartphone—might also be made possible.

The prior art also includes the provision of a wireless communication link directly between the domestic appliance and a portable communications terminal while bypassing the home network. This direct communication can take place for example via an NFC (Near Field Communication) connection. Here too on the one side status data of the domestic appliance can be transferred to the portable communications terminal; on the other side control commands can also be transmitted from the portable communications terminal to the domestic appliance. Such a method for controlling a television or an air conditioning system is known from document US 2012/0236820 A1 for example. Here a communication link is initially established between a mobile telephone and the television using the NFC communication standard. After this communication link has been established, there is then further communication via a secondary network, such as a WLAN network for example.

A method for carrying out a support session with the aid of a portable communications terminal is known from document WO 2012/094520 A2.

A process for connecting a domestic appliance to a WLAN network is described in document WO 2013/015656 A1 for example.

Domestic appliances only have limited input possibilities available to them. If a domestic appliance is to be connected to a wireless home network, then access data to the home network, which is to be used during registration of the domestic appliance to the wireless network, should also be known in the domestic appliance. Entering this access data into the domestic appliance with the available input means is only possible to a limited extent or not at all. In addition signals of different networks can usually be received at a particular location. The domestic appliance must thus be specifically registered in an actual network, and connection to another network should be prevented. Choosing the correct network also represents a challenge for the domestic appliance, especially when the domestic appliance does not have any specially configured display and the choice cannot thus be made in the usual way.

BRIEF SUMMARY OF THE INVENTION

The object of the invention is to make it possible to connect a domestic appliance to a wireless home network without too much effort.

In accordance with the invention this object is achieved by a method, by a computer program product, by a portable communications terminal and also by a domestic appliance with the features in accordance with the relevant independent claims. Advantageous embodiments of the invention are the subject matter of the dependent claims, the description and the FIGURE.

An inventive method serves to connect a domestic appliance to a wireless home network with the aid of a portable communications terminal, such as a smartphone or a tablet PC for example. Access data of the home network is received by the portable communications terminal A wireless communication link separate from the home network and thus independent of the home network is set up between the domestic appliance on the one side and the portable communications terminal on the other side in accordance with a predetermined close-range communications standard. This close-range communications standard is a communications standard different from the standard of the home network. The portable communications terminal then transfers control commands to the domestic appliance via the communications link, wherein these control commands control the domestic appliance to connect to the wireless home network using the access data.

The inventive method has the particular advantage that the registration of the domestic appliance in the wireless home network can be undertaken without any great effort. The registration process does not have to be carried out directly at the domestic appliance, so that there are no technical restrictions associated with the control panel and the lack of input means and display devices. Because a close-range communications standard is used for direct data communication between the domestic appliance and the portable communications terminal, access to the data by unauthorized third parties is thus also prevented. This communication link can namely only be set up when the portable communications terminal is located in the direct vicinity of the domestic appliance. If NFC is used for example, then in accordance with this communications standard, data packets are exchanged encrypted, so that a further authentication, with its associated disadvantages, is not necessary. For the authentication process the user also only needs a very low level of technical knowledge in order to connect the domestic appliance to the wireless home network. In addition no or just a few user interactions or user inputs are necessary at the communications terminal itself.

In accordance with the invention there is provision for the network-side access data that is needed for connecting the domestic appliance to be made available on the portable communications terminal and for a communication link between the domestic appliance and the portable communications terminal to be established by means of a close-range communications technology, via which the domestic appliance is triggered by the portable communications terminal such that the domestic appliance connects itself directly to the wireless home network, using the transferred status data.

A portable communications terminal in this document is to be understood as a mobile terminal that is embodied for wireless communication in accordance with a predetermined communications standard and on which new applications (computer programs) can be installed and then executed. The portable communications terminal can for example be a mobile telephone (smartphone), a tablet PC or a comparable mobile terminal, such as an MP3 player with an appropriate communication device for example. In such cases the invention makes use of the fact that nowadays almost everyone has a mobile telephone with a display, so that use of additional communications devices is superfluous.

A domestic appliance in this document is to be understood as a device that is used for domestic management. This can especially be a large domestic appliance such as a device for the care of laundry items, a cooker, a refrigerator, a fridge/freezer combination, an air conditioning device or a dishwasher. A device for the care of laundry items in this case can be a washing machine, a washer/dryer or a tumble dryer. The domestic appliance can however also be a small appliance, such as a fully-automatic coffee maker or a food processor.

A close-range communications standard is to be understood here especially as a standard for wireless communication, having a range of a maximum of one meter. This form of embodiment has the advantage in respect of security since—as already stated—access to the data by unauthorized third parties can be prevented.

Especially preferably the communication link is set up using the NFC communications standard. To this end the domestic appliance and the portable communications terminal can each have respective communication devices that are embodied for data communication according to the NFC standard. The short range of NFC enables interference with other devices to be prevented and access to the data by unauthorized third parties can also be excluded. The range of NFC is namely so short that the user has to be located in the immediate vicinity of the domestic appliance for the communication link to be able to be established at all. In addition communication according to the NFC standard is undertaken encrypted, so that here a further authentication of the domestic appliance with the portable communications terminal, with its associated disadvantages, is rendered superfluous.

As an alternative to the NFC communications standard, the Bluetooth standard or a standard for optical data communication can be used.

By contrast the wireless home network is preferably a WLAN network. The domestic appliance is thus linked to a WLAN network as a home network. In this form of embodiment the access data can comprise the SSID (Service Set Identifier) of an access point of the WLAN network, and especially also a WPA (WiFi Protected Access) key. This data makes it possible for the domestic appliance to register itself in the WLAN network and to link itself to the WLAN network in terms of communications technology.

The access data transferred to the domestic appliance can optionally also contain the name of the home network with which the domestic appliance is to connect.

As already stated, the access data is received by the portable communications terminal. This receipt of the access data can take the widest variety of forms of embodiment: On the one hand the access data can be entered by an operator via an input device of the portable communications terminal Operators thus enter the access data themselves at the portable communications terminal here, for example with the aid of a virtual keyboard via a touch screen. In addition or as an alternative however there can also be provision for the portable communications terminal to receive a message, for example an SMS (Short Message Service) and/or an e-mail, with the access data. As a further addition or alternative it is also possible for the access data to be transmitted from an access point of the wireless home network to the portable communications terminal. In any event the transmission of the access data to the portable communications terminal is especially user-friendly.

In one form of embodiment there is provision for an identifier of the domestic appliance to be transmitted for the wireless home network via the communication link from the domestic appliance to the portable communications terminal. This identifier is thus received by the portable communications terminal, so that the portable communications terminal knows the identifier of the domestic appliance. The identifier can involve a MAC (Media Access Control) address for example, which represents an individual and specific designation of the domestic appliance in the wireless home network. The transfer of the identifier from the domestic appliance to the portable communications terminal has the advantage that the portable communications terminal can itself log on with this identifier of the domestic appliance to the wireless home network and can thus pose as the domestic appliance in the home network. In this way the domestic appliance can already be logged on or registered in the home network by the portable communications terminal. A check can also be made by the portable communications terminal as to whether the connection of the domestic appliance to the home network has any prospect of functioning at all.

Thus in one form of embodiment there can be provision that, before the control of the domestic appliance for connection to the wireless home network, a data connection is set up by the portable communications terminal to the wireless network using the received identifier of the domestic appliance and is then preferably disconnected again. The portable communications terminal can thus already register the domestic appliance in the home network in advance and can thus also check whether it is at all possible to connect the domestic appliance to the home network. If necessary error messages can be output here.

The domestic appliance is preferably only controlled for connecting it to the wireless home network after the successful setup of said data connection between the portable communications terminal and the home network using the identifier of the domestic appliance. The domestic appliance is especially controlled for connecting it to the wireless home network only after the successful disconnection of this data connection. It can thus be insured that the domestic appliance can then couple itself to the home network. There is thus practically a handover of the data connection from the portable communications terminal to the domestic appliance.

The registration of the domestic appliance in the wireless home network can thus be undertaken by the portable communications terminal. The identifier of the domestic appliance is then already known in the home network. Such a procedure has the advantage that the person using the portable communications terminal can select the correct home network with which the data connection is to be set up without much effort—for example by means of a touchscreen. This is based on the problem that usually a number of home networks are present at one specific location and the device can thus usually receive the signals of a number of home networks. With the aid of a conventional control panel of a domestic appliance it is not possible to select the correct network. If the portable communications terminal successfully connects itself to the home network using the identifier of the domestic appliance, this connection can then be handed over to the domestic appliance itself.

The successful connection of the domestic appliance to the wireless home network can also be detected by the portable communications terminal and then be signaled by means of an output device—for example said touch screen—of the portable communications terminal. The operator is thus informed about the successful authentication process. This can for example manifest itself as the domestic appliance sending a corresponding message, which contains information about the successfully concluded connection process, to the portable communications terminal after successful connection to the wireless home network. This message can be transmitted for example via the close-range communication link but also already via the wireless communication network.

The invention also relates to a computer program product with a storage medium on which a computer program product is stored, which is designed, when executed by a portable communications terminal, to carry out an inventive method.

An inventive portable communications terminal is embodied to carry out an inventive method.

The invention also relates to a domestic appliance with a first communications device for connecting the domestic appliance to a wireless home network, and with a second communications device for setting up a wireless communication link separate from the home network to a portable communications terminal in accordance with a predetermined close-range communications standard. A control device of the domestic appliance is designed to receive control commands from the portable communications terminal via the communication link of the second communications device and, on the basis of the control commands, to control the first communications device for connection to the wireless home network using access data of the home network contained in the control commands.

The preferred forms of embodiment and their advantages presented with regard to the inventive method are correspondingly valid for the inventive computer program product, for the inventive communications terminal and also for the inventive domestic appliance.

Further features of the invention emerge from the claims, the FIGURE and the FIGURE description. All features and combinations of features given here in the description, as well as the features and combinations of features described below in the FIGURE description and/or shown on their own in the FIGURE are not just able to be used in the respective combination specified but also in other combinations or on their own.

BRIEF DESCRIPTION OF THE SEVERAL VIEWS OF THE DRAWING

The invention will now be explained in greater detail on the basis of a preferred exemplary embodiment and also with reference to the enclosed drawing. The single FIGURE in this case shows a schematic diagram of a system with a domestic appliance and a portable communications terminal in accordance with a form of embodiment of the invention.

DESCRIPTION OF THE INVENTION

A system 1 shown in the FIGURE comprises a domestic appliance 2 as well as a portable communications terminal 3. In the exemplary embodiment the domestic appliance 2 is embodied as a washing machine, which includes a washing drum 4, which is supported rotatably in the domestic appliance 2 around an axis of rotation 5 running horizontally. The washing drum 4 is driven by a drive motor 6, which is controlled by a control device 7 of the domestic appliance 2. The domestic appliance 2 also has a first and a second communications device 8, 9. The first communications device 8 is used for communication with a wireless home network 10 and, to put it more precisely, with an access point 11 of the home network 10, which in the exemplary embodiment is integrated into a router 12. The home network 10 is a WLAN network. By contrast the second communications device 9 of the domestic appliance 2 is used for direct communication with the portable communications terminal 3 in accordance with a close-range communications standard, in the exemplary embodiment in accordance with the NFC standard.

The domestic appliance 2 also has a control panel 13, which is used for controlling the domestic appliance 2 and, in a manner known per se, can have a small display and a number of control elements for example.

In the exemplary embodiment the portable communications terminal 3 is a tablet PC. However a smartphone can also be used as an alternative. The portable communications terminal 3 is also embodied for communication with the home network 10 and also for communication with the second communications device 9 embodied in accordance with the NFC standard. For these purposes the portable communications terminal 3 likewise contains corresponding communications devices (not shown). The portable communications terminal 3 has a display 14, which serves as both an input device and an output device and in this regard is embodied as a touchscreen. The display 14 thus has a touch-sensitive surface 15, via which operator entries can be made at the portable communications terminal 3.

The domestic appliance 2 is now to be connected and registered to the wireless home network for communication purposes. A method in accordance with one form of embodiment of the invention will be explained in greater detail below.

The user installs a corresponding application (computer program) on the portable communications terminal 3, which requests the user to locate the portable communications terminal 3 directly in front of the domestic appliance 2, in order to start the registration process. When the portable communications terminal 3 comes within range of NFC communication, a communication link 16 is set up via NFC. Via this communication link 16 the data relevant for the registration of the domestic appliance 2 can now be transmitted from the domestic appliance 2 to the communications terminal 3. This data especially includes an identifier (MAC address) of the domestic appliance 2 or of the first communications device 8. Since NFC exchanges the transferred data packets encrypted, further authentication between the communications terminal 3 and the domestic appliance 2 is not needed. This can be done automatically and can be signaled to the user on the portable communications terminal.

In a further step the access data of the home network 10, which is needed for connection of the domestic appliance 2, is also made available to the portable communications terminal 3. In the exemplary embodiment this access data contains the SSID of the access point 11 and in addition the WPA key. This access data can be made available to the portable communications terminal 3 in a different manner. For example an operator 17 can enter this access data himself on the touch-sensitive surface 15 using a corresponding operator entry 18. It is also possible to notify the portable communications terminal 3 of the access data via a message 19 represented by the arrow 20, especially with an SMS and/or an e-mail. The access data of the home network 10 is thus stored in the portable communications terminal 3.

The operator 17 can now select the correct home network 10 at the portable communications terminal 3. The portable communications terminal 3 then connects itself to the access point 11 using the identifier of the domestic appliance 2 and thus poses as the first communications device 8 of the domestic appliance 2. For this registration it is not necessary for the operator 17 to remain at the domestic appliance 2 for the entire time. This is merely necessary for the initiation of the process and the transmission of the data via the communication link 16.

The identifier of the domestic appliance 2 is thus registered in the home network 10. The communications terminal 3 now checks whether this registration was successful or whether a data connection 21 to the home network 10 using the identifier of the domestic appliance 2 is possible at all. After successful setup of the data connection 21, said connection can be disconnected again or handed over to the domestic appliance 2.

The portable communications terminal 3 can then trigger the domestic appliance 2 via the communication link 16, so that the domestic appliance 2 connects directly to the home network 10 via a connection 22. To this end the portable communications terminal 3 transfers the required access data of the home network 10 to the domestic appliance 2.

Whether the connection of the domestic appliance 2 to the home network 10 was successful or has failed is signaled via the communications terminal 3. The domestic appliance 2 can notify the communications terminal 3 of this via a corresponding message.

LIST OF REFERENCE CHARACTERS

1 System
2 Domestic appliance
3 Portable communications terminal
4 Washing drum
5 Axis of rotation
6 Drive motor
7 Control device
8 First communications device
9 Second communications device
10 Home network
11 Access point
12 Router
13 Control panel
14 Display
15 Touch-sensitive surface
16 Communication link
17 Operator
18 Operator entry
19 Message
20 Arrow
21 Data connection
22 Connection

The invention claimed is:

1. A method for connecting a domestic appliance to a wireless home network, which comprises the steps of:
   receiving access data of the wireless home network in a portable communications terminal;
   setting up a wireless communication link separate from the wireless home network between the domestic appliance on one side and the portable communications terminal on another side in accordance with a predetermined close-range communications standard;
   transmitting control commands from the portable communications terminal via the wireless communication link to the domestic appliance, the domestic appliance being controlled by the control commands to connect to the wireless home network using the access data;
   sending an identifier of the domestic appliance for the wireless home network via the wireless communication link from the domestic appliance to the portable communications terminal;
   with the portable communication terminal, logging on to the wireless home network using the identifier of the domestic appliance and posing as the domestic appliance in the home network;
   wherein before a control of the domestic appliance for connection to the wireless home network is accomplished, performing the step of setting up a data connection by the portable communications terminal to the wireless home network using the identifier sent by the domestic appliance, wherein the domestic appliance is only controlled for connection to the wireless home network after a successful setup of the data connection;
   detecting a successful connection of the domestic appliance to the wireless home network by the portable communications terminal and signaling the successful connection by means of an output device of the portable communications terminal; and
   handing over the data connection from the portable communications terminal to the domestic appliance.

2. The method according to claim 1, which further comprises setting up the wireless communication link using a communications standard selected from the group consisting of a near field communications standard, a Bluetooth communications standard and a communications standard for optical communication.

3. The method according to claim 1, which further comprises connecting the domestic appliance to a wireless local area network as the wireless home network and the access data contains a service set identifier of an access point of the wireless local area network and a WiFi protected access key.

4. The method according to claim 1, wherein the receiving step of receiving the access data by the portable communications terminal further includes at least one additional step of:
   entering the access data via an input device of the portable communications terminal by an operator;
   receiving a message in the portable communications terminal; or
   transmitting the access data from an access point of the wireless home network to the portable communications terminal.

5. The method according to claim 1, wherein the receiving step of receiving the access data by the portable communications terminal further includes at least one additional step of:
   entering the access data via an input device of the portable communications terminal by an operator;

receiving at least one of an SMS message or an e-mail message with the access data in the portable communications terminal; or transmitting the access data from an access point of the wireless home network to the portable communications terminal.

6. A computer program product, comprising:

a non-transitory storage medium containing a computer program to be executed by a portable communications terminal, said computer program performing a method for connecting a domestic appliance to a wireless home network, and comprises the steps of:

receiving access data of the wireless home network in a portable communications terminal;

setting up a wireless communication link separate from the wireless home network between the domestic appliance on one side and the portable communications terminal on another side in accordance with a predetermined close-range communications standard;

transmitting control commands from the portable communications terminal via the wireless communication link to the domestic appliance, the domestic appliance being controlled by the control commands to connect to the wireless home network using the access data;

sending an identifier of the domestic appliance for the wireless home network via the wireless communication link from the domestic appliance to the portable communications terminal;

with the portable communication terminal, logging on with the identifier of the domestic appliance to the wireless home network and posing as the domestic appliance in the home network;

before a control of the domestic appliance for connection to the wireless home network is accomplished, performing the step of setting up a data connection by the portable communications terminal to the wireless home network using the identifier sent by the domestic appliance, wherein the domestic appliance is only controlled for connection to the wireless home network after a successful setup of the data connection;

detecting a successful connection of the domestic appliance to the wireless home network by the portable communications terminal and signaling the successful connection by means of an output device of the portable communications terminal; and handing over the data connection from the portable communications terminal to the domestic appliance.

7. A portable communications terminal, comprising:

a processor configured to perform a method for connecting a domestic appliance to a wireless home network, which comprises the steps of:

receiving access data of said wireless home network in the portable communications terminal;

setting up a wireless communication link separate from the wireless home network between the domestic appliance on one side and the portable communications terminal on another side in accordance with a predetermined close-range communications standard;

transmitting control commands from the portable communications terminal via the wireless communication link to the domestic appliance, the domestic appliance being controlled by the control commands to connect to the wireless home network using the access data;

sending an identifier of the domestic appliance for the wireless home network via the wireless communication link from the domestic appliance to the portable communications terminal;

with the portable communication terminal, logging on with the identifier of the domestic appliance to the wireless home network and posing as the domestic appliance in the home network;

before a control of the domestic appliance for connection to the wireless home network is accomplished, performing the step of setting up a data connection by the portable communications terminal to the wireless home network using the identifier sent by the domestic appliance, wherein the domestic appliance is only controlled for connection to the wireless home network after a successful setup of the data connection; and detecting a successful connection of the domestic appliance to the wireless home network by the portable communications terminal and signaling the successful connection by means of an output device of the portable communications terminal; and handing over the data connection from the portable communications terminal to the domestic appliance.

8. A domestic appliance in communication with a portable communications terminal, comprising:

a first communications device for connecting the domestic appliance to a wireless home network;

a second communications device for setting up a wireless communication link separate from the wireless home network to the portable communications terminal in accordance with a predetermined close-range communications standard;

a control device designed to receive control commands from the portable communications terminal via said wireless communication link of said second communications device and, on a basis of the control commands, controlling said first communication device to connect to the wireless home network using access data of the wireless home network contained in the control commands;

said control device additionally configured to send an identifier of the domestic appliance for the wireless home network via the wireless communication link from the domestic appliance to the portable communications terminal, such that the portable communication terminal can log on with the identifier of the domestic appliance to the wireless home network and can pose as the domestic appliance in the home network;

before a control of the domestic appliance is accomplished, the portable communication terminal sets up a data connection to the wireless home network using the identifier sent by the domestic appliance and detects a successful connection of the domestic appliance to the wireless home network, the successful connection being signaled by an output device of the portable communications terminal, wherein the domestic appliance is only controlled for connection to the wireless home network after a successful setup of the data connection; and the portable communications terminal configured to hand over the data connection to the domestic appliance.

* * * * *